Feb. 3, 1959     D. W. SAWYER ET AL     2,871,563
ROTATING PLATES FOR PARALLAX MEASUREMENT
Filed Oct. 28, 1954
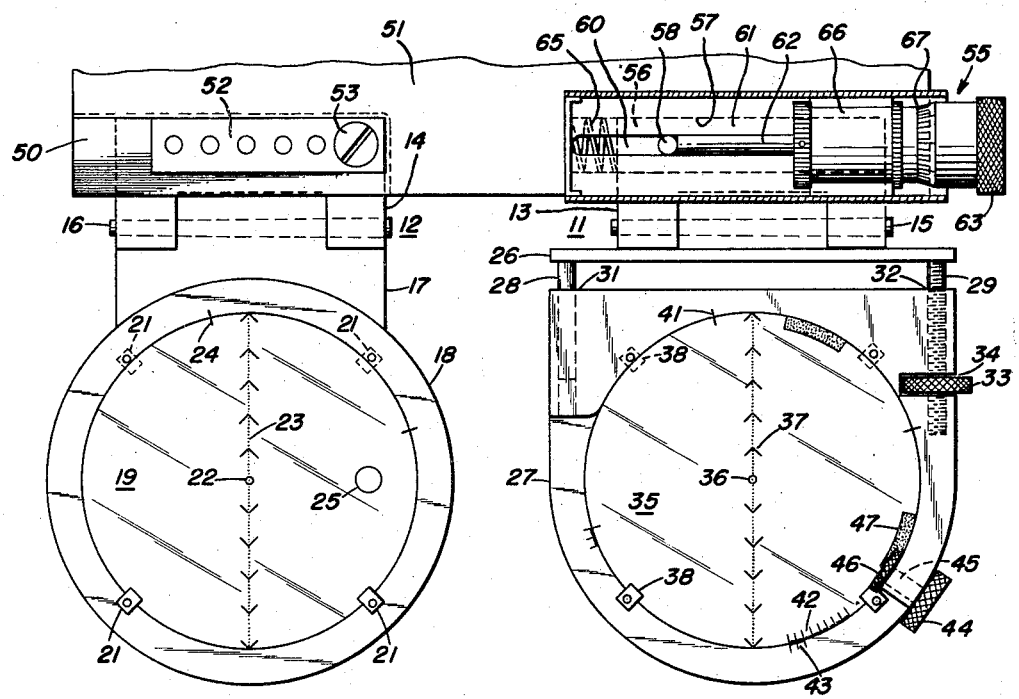
INVENTORS
DONALD W. SAWYER
ARTHUR C. LUNDAHL
BY
ATTORNEYS

United States Patent Office 2,871,563
Patented Feb. 3, 1959

2,871,563

ROTATING PLATES FOR PARALLAX MEASUREMENT

Donald W. Sawyer, Washington, D. C., and Arthur C. Lundahl, Bethesda, Md.

Application October 28, 1954, Serial No. 465,451

5 Claims. (Cl. 33—1)

(Granted under Title 35, U. S. Code (1952), sec. 266)

The invention described herein may be manufactured and used by or for the Government of the United States of America for governmental purposes without the payment of any royalties thereon or therefor.

The present invention relates to rotating plates for parallax measurement and more particularly to rotating plates for parallax measurement which utilize a stereoscopically fused line as a reference plane.

Prior to the development of the present invention, the devices employed to measure parallax used the "floating dot" technique wherein two dots are fused stereoscopically into one apparent dot. The apparent dot is made to rise and fall with respect to a stereoscopic pair of photographs from the observers viewpoint by changing the straight line distance between the two unfused dots. Heights and depths are measured using this technique by determining the change in straight line distance between the two unfused dots when the apparent dot is placed first at the base of an object and then at the top, or vice versa. One such prior art device is shown in Patent No. 2,104,778, issued to B. F. Talley, wherein the operation of parallax measuring devices utilizing the floating dot principle is fully explained.

The operation of the various devices utilizing the "floating dot" technique is complicated, time consuming and requires unusually good depth perception. In addition, the fused dot is difficult to see against the background of the photographs and numerous readings are required to establish gradient and slope determinations.

The present invention comprises a pair of rotating plates, each of which has a graduated centerline marked thereon. The two centerlines are fused stereoscopically into one apparent centerline which is then used to measure parallax. The present invention overcomes the shortcomings of the prior art devices in that the line is much easier to see than a dot and is easier to position on the photographs, gradient and slope determinations require but a single reading, and it is quick and simple to operate.

An object of the present invention is the provision of a device which facilitates quick and easy measurement of parallax.

Another object of the present invention is the provision of a parallax measuring device which determines slope and gradient by a single reading.

A further object of this invention is the provision of a parallax measuring device for rapidly surveying a photograph to determine all points above or below a certain datum plane.

Other objects and many of the attendant advantages of this invention will be readily appreciated as the same becomes better understood by reference to the following detailed description when considered in connection with the accompanying drawing wherein:

The figure is a plan view of the right and left plate assemblies of the present invention.

Referring more particularly to the drawing, the plate assemblies 11 and 12 are adapted to be attached to a stereoscope (shown schematically in dotted lines) such as is shown in Patent No. 2,104,778, referred to above, or other similar instrument. The attachment holders 13 and 14 which secure the plate assemblies to the viewer are pivotally connected, as by pins 15 and 16, to the respective assemblies 11 and 12 to permit the assemblies to be lifted from the photographs being examined without moving the viewer. Plate assembly 12 is adjustable in the x-direction (parallel to pivot pin 16), by movement of the attachment holder 14 in slot 50 formed in stereoscope support 51. Use is made for step-by-step adjustment of a cover plate 52 in which are made a series of alined holes, and a pin 53 is placed in one of these holes to enter a hole formed in the attachment holder, and thus hold it at a fixed position. Plate assembly 11 is, similarly, adjustable, but instead of step-by-step adjustment, use is made of a micrometer 55 for accurate close lateral movement of the plate assembly. A slide element 56 forming part of the attachment holder 13, is transversely movable in slot 57 in the stereoscope support 51. A stop pin 58 projects outwardly from the slide 56 through a slot 60 formed in the stationary cover plate 61. The micrometer screw 62, actuated by the knurled head 63, moves pin 58 and the attached slide 56 lengthwise in slot 57, against the expansive force of coiled spring 65. Micrometer 55, which is supported by collar 66, is provided with the usual micrometer measuring indicia 67. The left plate assembly 12 includes a hinge portion 17 which is attached to the frame 18 and a transparent plate 19 which is received within the frame and retained therein by suitable retaining means, such as the clips 21. The plate 19 is marked with a centerline, as shown, which consists of a small circle 22 at the center of the plate and a graduated line 23 extending from opposite sides thereof to the periphery of the plate. A knob 25 is provided on the plate 19 whereby the plate can be rotated to align the index marks 24 on the plate and the frame so as to properly position the plate with respect to the frame and permit radial measurements from the plate center as the origin.

The right plate assembly 11 includes a hinge portion 26 and a frame 27 connected thereto by means of pin 28 and screw 29 which are received within the bores 31 and 32 respectively. A knurled knob 33 is positioned in a slot 34 in the frame 27 and is threadedly engaged with the screw 29 whereby the frame can be moved towards or away from the hinge portion 26 by turning the knob. The plate 35 is similar to the plate 19 in that it has a small center circle 36 and a graduated center line 37, it is retained within the frame 27 by means of the clips 38, for example. In addition, a scale 42 is provided at an edge of the plate 35 opposite a vernier scale 43 at the inner edge of the frame 27. Preferably, the scale 42 should be calibrated in terms of one-hundreths of an inch, whereby, using the vernier scale 43, a reading of one-thousandth of an inch may be accomplished. Rotation of plate 35 may be accomplished by rotating a knob 44 secured to a shaft 45 which is rotatably mounted on the frame 27 and is drivingly connected to the plate 35, such as by wheel 46 in contact with roughened portion 47 on the plate. Any other suitable plate rotating means may be employed.

In practice the graduated lines 23 and 37 may be made two inches long; the principal graduations (arrowheads) may be spaced two-tenths of an inch apart; and, ten equally spaced dots may be provided between each pair of principal graduations. The above dimensions will permit certain simplifications, more fully explained hereinafter, in the operation of the present invention.

In the operation of the present invention the right assembly is positioned over the right photograph of a stereoscopic pair and the left assembly is positioned over the left photograph. The rotating plates and the portions of the photographs therebelow are viewed with a stereoscope so as to obtain a stereoscopic or three-dimension model. The photographs have been previously aligned along the flight line, separated by a distance determined by the photo air base, and positioned with respect to the stereoscope so that the flight line is parallel to the base of the instrument. Index marks 24 on the left plate assembly and index marks 41 on the right plate assembly are aligned. Lines 23 and 37 are then parallel and normal to the flight line. Any tilt in the photographs may be compensated by means of the y-motion adjustment means provided on plate assembly 11 (knob 33 and screw 29). When the center lines are parallel to each other and normal to the flight line, they are made to fuse into one apparent line by changing the straight line distance between plate centers. The change in distance between plate centers is accomplished by the x-motion adjustment of the stereoscopic instrument to which the left and right assemblies are attached, as previously described. The x-motion adjustment is continued until the small circle at the center of the apparent line appears to rest on the datum plane selected from which heights, depths or gradients are to be measured. This much of the operation of the present invention follows, essentially the "floating dot" technique and if desired, heights or depths can be measured by utilizing the apparent center circle as the dot and varying the straight line distance between the unfused center circles by means of the x-motion adjustment, as described in patent No. 2,104,778, noted above, for example.

When the two centerlines are normal to the flight line the x-parallax is constant for all points on both lines and these two lines fuse into one line floating in a horizontal position. When the right plate is rotated slightly, the apparent line will appear to be higher on one end and lower on the other, pivoting at the center of the line represented by the small circle. Rotation of plate 35 produces a parallactic difference between corresponding dots on graduated lines 23 and 37 according to the following relationship:

(1) $$p_x = d \sin \phi$$

where:

$p_x$ = x-direction parallactic difference between corresponding dots on lines 23, 37
$d$ = the distance between a dot on line 37 and circle 36
$\phi$ = the angle of rotation of plate 35

It is to be noted that rotation of plate 35 also produces an increment of y-parallax according to the relation:

(2) $$p_y = d \sin \phi \tan \phi$$

Since $\phi$, however, is small, this increment will be negligible and therefore not objectionable.

For the extreme graduations on lines 23 and 37, $p_x$ may be read directly from scale 42 in conjunction with vernier scale 43. For any intermediate corresponding dots on lines 23 and 37, $p_x$ may be determined according to the following formula:

(3) $$\frac{P_x}{p_x} = \frac{L}{d}$$

where:

$P_x$ = Parallactic difference of the end graduations
$p_x$ = Parallactic difference of intermediate dots
$L$ = length of the line 37 between circle 36 and the end of the line
$d$ = distance from the circle 36 to the dot Since in practice L equals one inch, Equation 3 becomes:

(4) $$p_x = d P_x$$

Scale 42 and vernier 43 may, of course, be calibrated to read the angle of rotation of plate 35 and $p_x$ may then be determined according to Equation 1. Either method of calibration will provide an indication of the displacement of a graduation or dot on line 37 from a corresponding graduation or dot on line 23.

Slopes or gradients are determined by employing the following relationship:

(5) $$g = \frac{b+p}{F_v}$$

where:

$g$ = gradient number
$b$ = photo air base (distance between the principal point on one photograph and the transferred principal point on the other photograph)
$F$ = focal length of the camera used to take the photographs
$p$ = parallactic difference Equation 5 is derived as follows:

(6) $$h = \frac{H_v}{b+p}$$

where:

$h$ = height to be determined.
$H$ = flying height above terrain.
$b$ = air base measured on photograph.
$p$ = parallactic difference between point to be measured and point of datum.

The gradient of a line is usually stated as 1 unit of rise to a number of units of linear measurement (e. g. 1 on 73). This may be symbolized by (7) $$\text{gradient} = h/D$$

where:

$h$ = vertical height.
$D$ = horizontal distance.

$h$ is determined from the parallax Formula 6 above, and D is determined from the scale of the photography.

(8) $$\text{scale} = f \div H$$

where:

$f$ = the camera focal length.
$H$ = the flying height.

Any ground distance may be determined by (9) $$D = dH/f$$

where:

$D$ = the ground distance in feet.
$d$ = image distance on photograph in inches.

Since in practice the distance $d$ (between circle 36 and the extreme graduation) is equal to one inch Equation 9 becomes:

(10) $$D = H/f$$

If (6) and (10) are substituted in (7) above we have

(11) $$\text{gradient} = \frac{F_v}{b+p}$$

The slope is usually expressed as a gradient number $g$ where:

(12) $$g = \frac{1}{\text{gradient}} = \frac{b+p}{F_v}$$

It will be noted that the altitude of the aircraft from which the photographs were made does not appear in Equation 5. Slope determinations may therefore be made with the present invention with no knowledge of this factor.

The procedure for determining slopes using Equation 5 is as follows:

(1) Orient the right plate (35) to the zero position by adjusting control knob (44).
(2) Orient the left plate (19) to the zero position indicated by index marks (24).
(3) When oriented in this manner, both sets of etched marks will:
   a. Be parallel to each other and normal to the base of the supporting instrument.

b. When viewed through the optical system, fuse into one set of marks distributed in a horizontal plane.

(4) Locate gradient to be measured and mark its upper and lower extremities.

(5) Locate fused line of marks over the gradient in question in such a manner that the circle 36 rests on the upper or lower point of the gradient. This is accomplished by manipulating the x-motion adjustment of the stereoscopic instrument.

(6) If the fused line passes through the second point on the gradient, the steps in subparagraphs *a*, *b*, *c*, and *d* below are omitted. If the fused line does not pass through the second point, follow steps *a*, *b*, *c* and *d* below,

*a*. Rotate the left plate so that the etched line passes through the second point. (The first point remains centered within the small circle.)

*b*. Read the distance between the two points defining the gradient extremities as seen on the left plate only. (It will aid the operator if he makes this reading with the right eye closed.)

*c*. Rotate the left plate back to its zero position, then shift the instrument so the fused circle at the center of the plates is displaced from the second point on the gradient by that distance read in (*b*) above.

*d*. Rotate the right plate very slowly, using the vernier control knob provided, until the point which defines the distance from the plate center, measured in (*b*) appears to rest at the ground surface.

(7) If the steps in subparagraphs *a*, *b*, *c*, and *d* were omitted, use the vernier control knob provided to rotate the right plate slowly, until the fused line of marks rest on the slope.

(8) Read the value indicated on the scale of the right plate. This is a hundredth of an inch scale with a vernier, and values are read directly to a thousandth of an inch. The value read is parallax (*p*) which is substituted in the formula:

$$g = b + p/fp$$

(9) A numerical example is given below to demonstrate the simple computation required if:

$$b = 2.795''$$
$$f = 6.055''$$
$$p = 0.012''$$

Solve for gradient:

$$g = b + p/fp$$

$$g = \frac{2.795 + 0.012}{6.055 \times 0.012}$$

$$g = \frac{2.807}{0.0727}$$

$$g = 38.61$$

Then the gradient is $$\frac{1}{38.61} \text{ or } 1:38.61$$

The present invention may also be used to make a rapid survey to determine all points above or below a certain datum plane. To accomplish this, the lines are fused and the apparent line is positioned on the desired datum plane by means of the x-motion adjustment. The apparent line may then be moved about over the desired area by moving either the stereoscope or the photographs.

In the construction of the plate assemblies of the present invention, the holders and frames are formed of a material having a minimum coefficient of expansion, such as an aluminum alloy, or the like. The rotating plates are formed of a transparent material which will afford an undistorted view of the photographs. The use of glass or clear plastic for the plates is contemplated to allow photographic reproduction of the fine lined marks on the plates.

Obviously many modifications and variations of the present invention are possible in the light of the above teachings. It is therefore to be understood that within the scope of the appended claims the invention may be practiced otherwise than as specifically described.

What is claimed is:

1. Parallax measurement apparatus for use in the interpretation of aerial photographs comprising a pair of similar plate assemblies adapted to be attached to a stereoscope, each of said assemblies including a circular transparent plate having a graduated center line thereon, a frame rotatably supporting said plate, and means for mounting said frame on a stereoscope; means for rotating at least one of said plates to thereby produce a parallactic difference between corresponding graduations on the plates, a scale on an edge of said one plate, and a vernier scale on the frame contiguous to said scale for measuring the amount of the plate rotation to provide an indication of said parallactic difference.

2. Parallax measurement apparatus for use in the interpretation of aerial photographs comprising a pair of similar plate assemblies adapted to be attached to a stereoscope, each of said assemblies including a circular transparent plate having a graduated center line thereon, a frame rotatably supporting said plate, and means for mounting said frame on a stereoscope; means for rotating at least one of said plates to thereby produce a parallactic difference between corresponding graduations on the plates, and scale means on said one plate and frame contiguous to said plate for measuring the amount of plate rotation to provide an indication of said parallactic difference.

3. Parallax measurement apparatus for use in the interpretation of aerial photographs comprising a pair of similar plate assemblies adapted to be attached to a stereoscope, each of said assemblies including a circular transparent plate having a graduated center line thereon, a frame rotatably supporting said plate, a holder pivotally attached to the frame for securing the assembly to a stereoscope, means to rotate at least one of said plates to thereby produce a parallactic difference between corresponding graduations on said plates, and means to indicate said parallactic difference including coacting scale indicia on contiguous edges of said one plate and frame.

4. In combination with a stereoscope including an x-motion adjustment means, first and second plate assemblies, each of which includes a circular transparent plate having a graduated center line thereon, a frame rotatably supporting the plate, and a holder pivoted to the frame; the plate assembly holders being attached to the x-motion adjustment means for movement towards or away from each other, means to rotate at least the plate of said first plate assembly to produce a parallactic difference between corresponding graduations on said plates and means to indicate said parallactic difference.

5. The combination of claim 4 in which one of said plate assemblies includes a *y*-motion adjustment means and said indicating means comprises a scale on the edge of the plate of said first plate assembly and a vernier scale on the frame thereof contiguous to said scale, said scale and vernier scale being calibrated to indicate x-direction parallactic difference.

References Cited in the file of this patent
UNITED STATES PATENTS

| | | |
|---|---|---|
| 1,894,148 | Barr | Jan. 10, 1933 |
| 1,999,236 | Hess | Apr. 30, 1935 |
| 2,104,778 | Talley | Jan. 11, 1938 |
| 2,363,643 | Cook | Nov. 28, 1944 |
| 2,428,435 | Schlatter | Oct. 7, 1947 |
| 2,569,498 | Schlatter | Oct. 2, 1951 |
| 2,724,182 | Gilkey | Nov. 22, 1955 |

OTHER REFERENCES

Pages 85 to 88 of Photogrammetic Engineering, vol. 11, No. 2, Apr., May, June 1945 (Scientific Library).